US 11,216,115 B2

(12) United States Patent
Lee et al.

(10) Patent No.: US 11,216,115 B2
(45) Date of Patent: Jan. 4, 2022

(54) ELECTRONIC DEVICE AND METHOD FOR CONTROLLING TOUCH SENSING SIGNALS AND STORAGE MEDIUM

(71) Applicant: Samsung Electronics Co., Ltd., Suwon-si (KR)

(72) Inventors: Sang-Yup Lee, Daegu (KR); Tae-Kyoung Kang, Gumi-si (KR); Yeon-Hwan Kim, Gumi-si (KR); Jun-Ho Ko, Gumi-si (KR); Young-Jun An, Gumi-si (KR); Won-Woo Yoo, Daegu (KR); Ji-Young Lim, Gumi-si (KR); Jang-Hoon Hong, Gumi-si (KR); Hyun-Suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/104,138

(22) Filed: Aug. 17, 2018

(65) Prior Publication Data
US 2019/0056836 A1 Feb. 21, 2019

(30) Foreign Application Priority Data
Aug. 18, 2017 (KR) .......................... 10-2017-0105018

(51) Int. Cl.
*G06F 3/041* (2006.01)
*G06F 3/044* (2006.01)
*H04M 1/02* (2006.01)

(52) U.S. Cl.
CPC ........ *G06F 3/04184* (2019.05); *G06F 3/0446* (2019.05); *G06F 3/041662* (2019.05);
(Continued)

(58) Field of Classification Search
CPC ...... G06F 3/0416; G06F 3/0418; G06F 3/044; G06F 2203/04105; G06F 2203/04108;
(Continued)

(56) References Cited

U.S. PATENT DOCUMENTS 8,970,537 B1 * 3/2015 Shepelev ............ G06F 3/04184
345/173
10,156,935 B2 * 12/2018 Lee ........................ G06F 3/0446
(Continued)

FOREIGN PATENT DOCUMENTS

EP 2958000 A2 12/2015
JP 2010092152 A 4/2010
(Continued)

OTHER PUBLICATIONS

ISA/KR, "International Search Report and Written Opinion of the International Searching Authority," International Application No. PCT/KR2018/009195, dated Nov. 12, 2018, 10 pages.
(Continued)

*Primary Examiner* — Amare Mengistu
*Assistant Examiner* — Jennifer L Zubajlo

(57) ABSTRACT

According to an embodiment, a method for operating an electronic device may comprise operating touch circuitry configured to detect a touch or hovering according to a first driving signal in a first operation mode, detecting a first event related to mode switching, and operating the touch circuitry according to a second driving signal different from the first driving signal in a second operation mode based on detecting the first event. Other embodiments are also possible.

15 Claims, 16 Drawing Sheets

(52) U.S. Cl.
CPC .............. *G06F 2203/04105* (2013.01); *G06F 2203/04108* (2013.01); *H04M 1/026* (2013.01); *H04M 1/0266* (2013.01); *H04M 2250/22* (2013.01)

(58) Field of Classification Search
CPC ........... G06F 3/04184; G06F 3/041662; G06F 3/0446; H04M 1/026; H04M 1/0266; H04M 2250/22
See application file for complete search history.

(56) References Cited

U.S. PATENT DOCUMENTS

| | | | |
|---|---|---|---|
| 10,409,414 B2* | 9/2019 | Kim | G06F 3/04166 |
| 2013/0265276 A1* | 10/2013 | Obeidat | G06F 3/041662 |
| | | | 345/174 |
| 2013/0285971 A1* | 10/2013 | Elias | G06F 3/0418 |
| | | | 345/174 |
| 2015/0002466 A1 | 1/2015 | Takeuchi et al. | |
| 2015/0062062 A1* | 3/2015 | Han | G06F 3/0446 |
| | | | 345/174 |
| 2015/0145802 A1* | 5/2015 | Yao | G06F 3/041662 |
| | | | 345/174 |
| 2015/0177880 A1 | 6/2015 | Shin et al. | |
| 2015/0346889 A1* | 12/2015 | Chen | G06F 3/0412 |
| | | | 345/174 |
| 2016/0035290 A1* | 2/2016 | Kim | G06F 3/0446 |
| | | | 345/174 |
| 2016/0048234 A1* | 2/2016 | Chandran | G06F 3/0383 |
| | | | 345/174 |
| 2016/0370948 A1* | 12/2016 | Lee | G06F 3/0446 |
| 2017/0003816 A1 | 1/2017 | Bernstein et al. | |
| 2017/0024124 A1* | 1/2017 | Ueno | G06F 3/04186 |
| 2017/0269751 A1* | 9/2017 | Cho | H01L 27/323 |
| 2018/0260051 A1* | 9/2018 | Kim | G06F 3/0445 |
| 2019/0102010 A1* | 4/2019 | Knabenshue | G06F 3/04162 |

FOREIGN PATENT DOCUMENTS

| | | |
|---|---|---|
| KR | 10-2004-0085770 A | 10/2004 |
| KR | 10-2010-0009020 A | 1/2010 |
| KR | 10-2013-0078937 A | 7/2013 |
| KR | 10-2015-0027529 A | 3/2015 |

OTHER PUBLICATIONS

Supplementary European Search Report in connection with European Application No. 18845880.6 dated Jun. 8, 2020, 11 pages.
Notification of the Reasons for Rejection dated Oct. 12, 2021, in connection with Korean Application No. 10-2017-0105018, 7 pages.

* cited by examiner

ELECTRONIC DEVICE AND METHOD FOR CONTROLLING TOUCH SENSING SIGNALS AND STORAGE MEDIUM

CROSS-REFERENCE TO RELATED APPLICATION AND CLAIM OF PRIORITY

This application is based on and claims priority under 35 U.S.C. § 119 to Korean Patent Application No. 10-2017-0105018 filed on Aug. 18, 2017 in the Korean Intellectual Property Office, the disclosure of which is incorporated herein by reference in its entirety.

BACKGROUND

1. Field

Various embodiments relate to touch circuitry and electronic devices having the same.

2. Description of Related Art

An electronic device may include at least one display. The user may control the electronic device through an input device while viewing various operational states of the electronic device or application operations through the display. Portable electronic devices, e.g., smartphones, may have an input device (e.g., a touchscreen) capable of receiving users' touch inputs to the screen and provide user interfaces.

The above information is presented as background information only to assist with an understanding of the disclosure. No determination has been made, and no assertion is made, as to whether any of the above might be applicable as prior art with regard to the disclosure.

SUMMARY

Electronic devices with capacitive touch circuitry (e.g., a touchscreen) may be subject to occurrence of unintended capacitance between a touch sensor and a display panel, and the electronic devices may cause noise upon operation according to self- and/or mutual capacitance sensing type. When the user presses the touch screen of the electronic device or brings the electronic device close to her eye for calling, the capacitance between the touch sensor and the display panel varies, creating noise.

According to various embodiments, an electronic device may control touch sensing signals, reducing or removing noise.

According to an embodiment, an electronic device may comprise a housing including a first plate and a second plate positioned opposite the first plate, a display positioned between the first plate and the second plate, a touch sensing panel positioned between the display and the first plate, spaced apart from the display by an air gap, and including a plurality of first conductive lines extending in a first direction and a plurality of second conductive lines extending in a different direction from the first direction as viewed from the first plate and crossing the plurality of first conductive lines, a wireless communication circuit, at least one processor functionally connected with the display, the panel, and the wireless communication circuit, and a memory functionally connected with the processor, wherein the memory may store instructions executed to enable the processor to detect an external object above or near the first plate; in a first operation, alternately use a first detection scheme and a second detection scheme, the first detection scheme detecting, independently, variations in capacitances of the plurality of first conductive lines and the plurality of second conductive lines during a first time period, and the second detection scheme providing voltages to the plurality of first conductive lines and measuring voltages at the plurality of second conductive lines during a second time period; and in a second operation, alternately use a modified first detection scheme and the second detection scheme or use the second detection scheme alone.

According to an embodiment, touch circuitry may include a touch sensor and a control circuit electrically connected with the touch sensor. The control circuit may be configured to provide a first driving signal to the touch sensor in a first operation mode, detect a first event related to mode switching, and provide a second driving signal different from the first driving signal to the touch sensor in a second operation mode based on detecting the first event.

According to an embodiment, an electronic device may comprise a housing and touch circuitry mounted inside the housing or at least partially disposed inside the housing and configured to detect a touch or hovering. The touch circuitry may be configured to operate in a first operation mode and according to a first driving signal, detect a first event related to mode switching, and operate in a second operation mode and according to a second driving signal different from the first driving signal based on detecting the first event.

According to an embodiment, a method for operating an electronic device may comprise operating touch circuitry configured to detect a touch or hovering according to a first driving signal in a first operation mode, detecting a first event related to mode switching, and operating the touch circuitry according to a second driving signal different from the first driving signal in a second operation mode based on detecting the first event.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
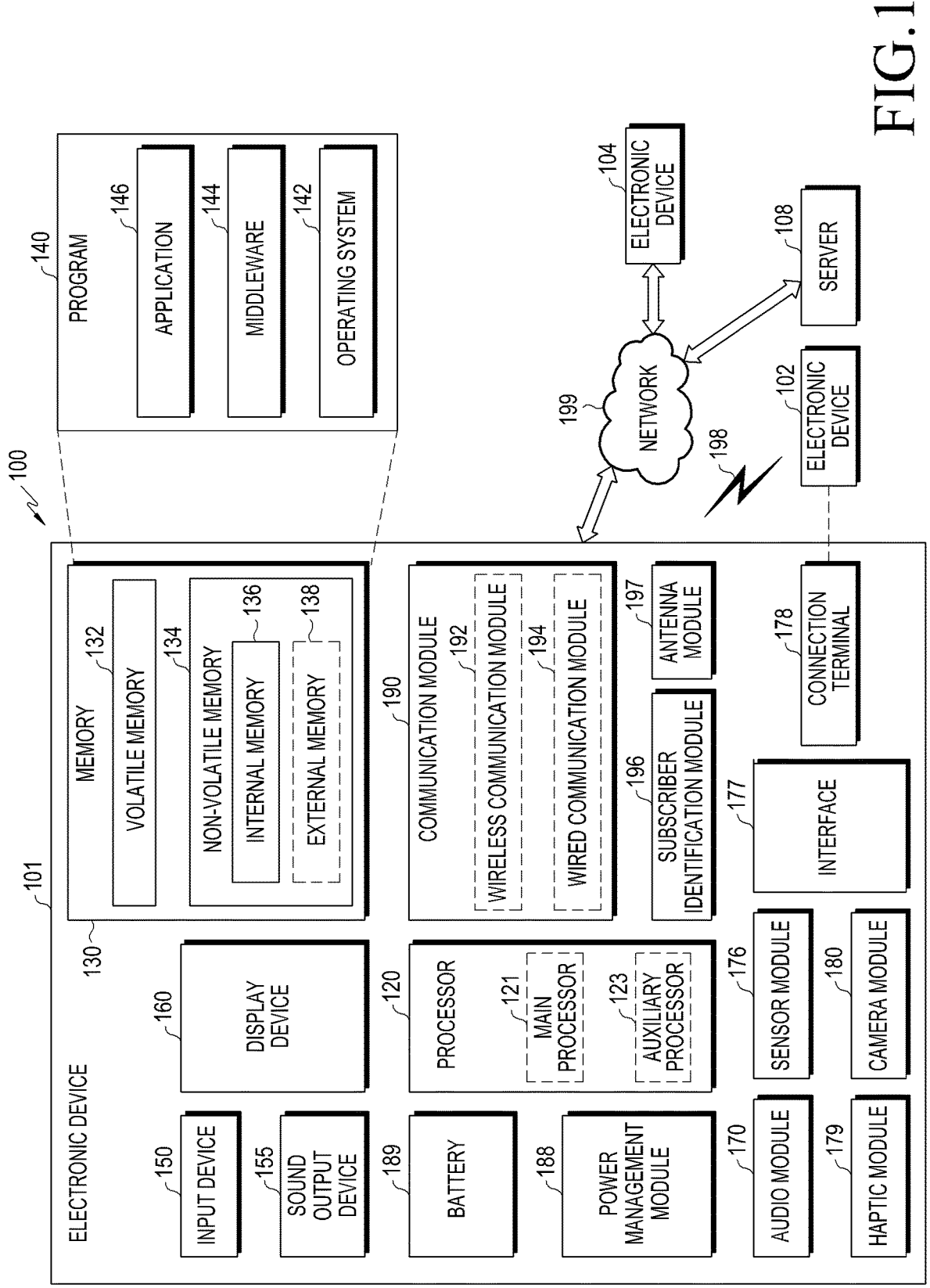
FIG. 1 is a view illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some (or at least a portion) of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

The connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
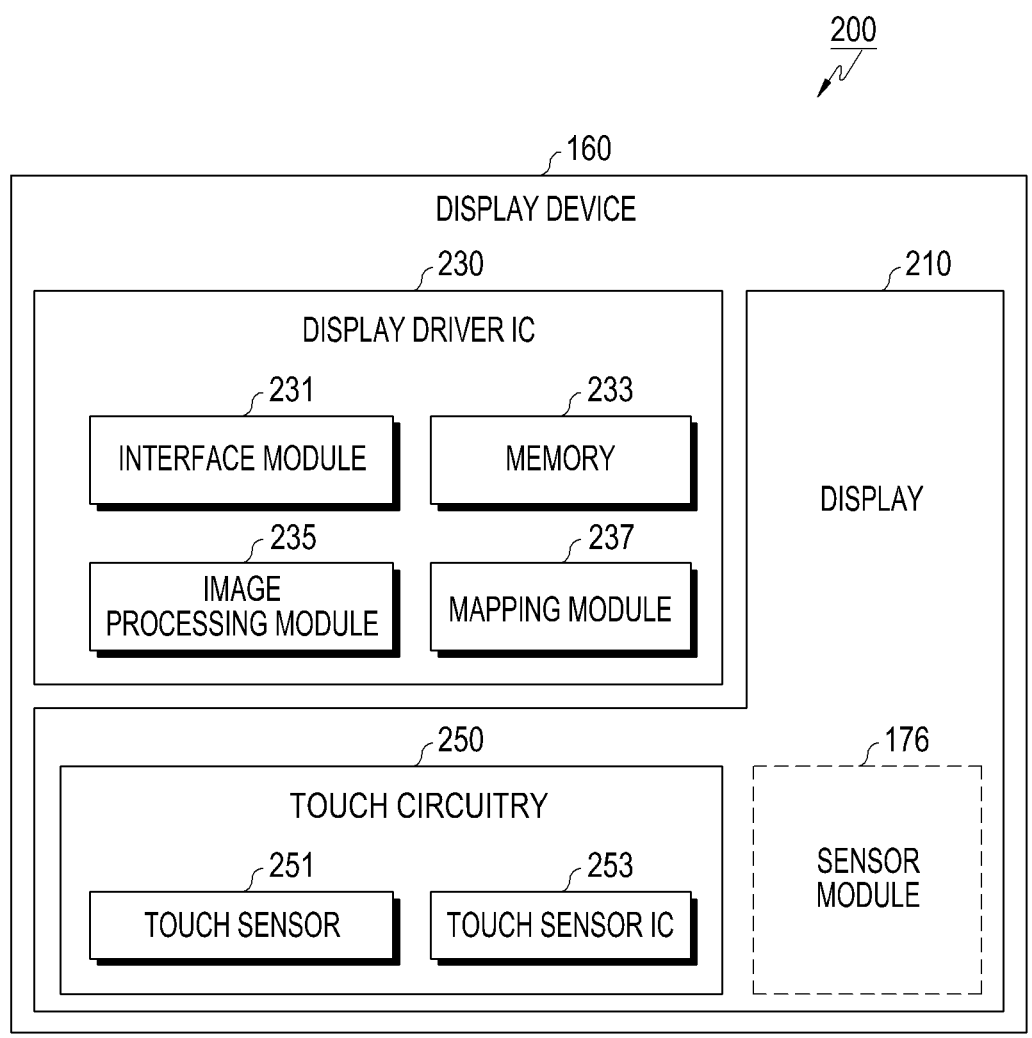
FIG. 2 is a block diagram illustrating a display device according to an embodiment.

FIG. 2 is a block diagram 200 illustrating the display device 160 according to various embodiments. Referring to FIG. 2, the display device 160 may include a display 210 and a display driver integrated circuit (DDI) 230 to control the display 110. The DDI 230 may include an interface module 231, memory 233 (e.g., buffer memory), an image processing module 235, or a mapping module 237. The DDI 230 may receive image information that contains image data or an image control signal corresponding to a command for controlling the image data from the processor 120 (e.g., the main processor 121 (e.g., an application processor) or the auxiliary processor 123 operated independently from the function of the main processor 121) through, e.g., the interface module 231. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may convert the image data pre- or post-processed by the image processing module 135 into a voltage value or current value at which pixels of the display 210 may be driven, based on, at least, at least part of attributes of the pixels (e.g., the array (RGB stripe or pentile)) of the pixels or the size of each subpixel). At least some pixels of the display 210 may be driven based on, e.g., the voltage value or current value so that visual information (e.g., text, image, or icon) corresponding to the image data may be displayed on the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251, sense a touch input or hovering input at a particular position of the display 210, e.g., by measuring a variation in a signal (e.g., a voltage, quantity of light, resistance, or quantity of electric charge) for the particular position of the display 210, and provide information (e.g., the position, area, pressure, or time) regarding the sensed touch input or hovering input to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the techniques set forth herein to particular embodiments and that various changes, equivalents, and/or replacements therefor also fall within the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated according to the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semi permanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

Figure 3A:
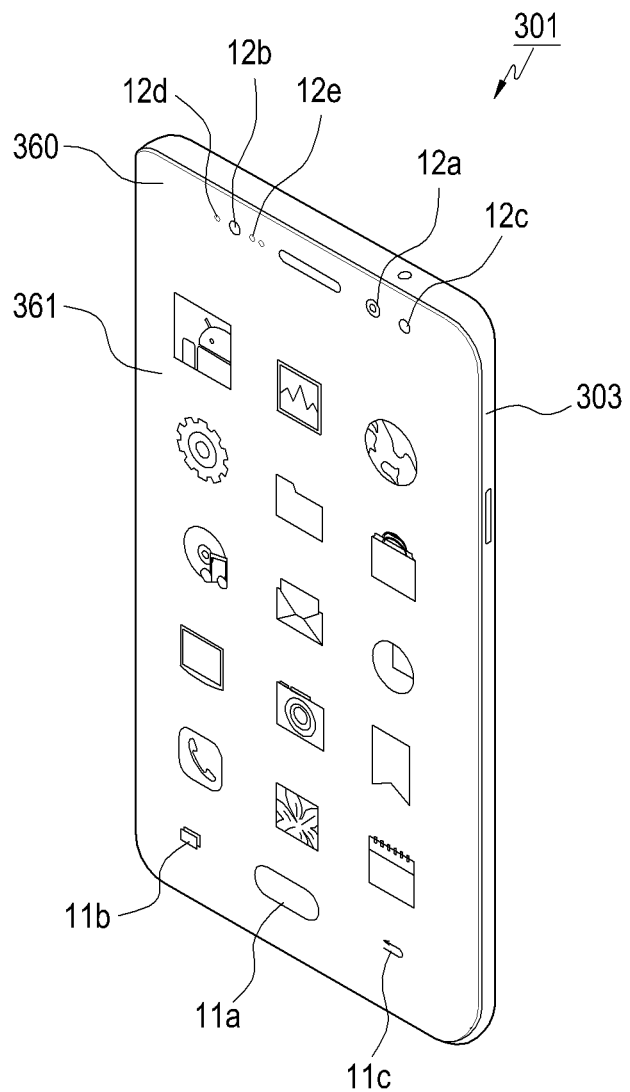
FIG. 3A is a perspective view illustrating an electronic device according to an embodiment.
Figure 3B:
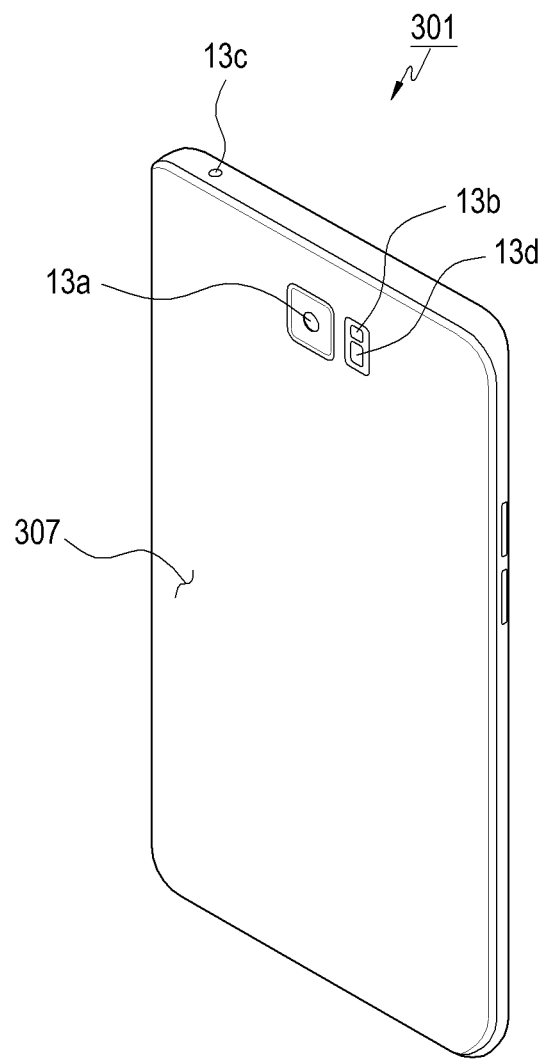
FIG. 3B is a perspective view illustrating an electronic device as viewed in a different direction.

FIG. 3A is a perspective view illustrating an electronic device according to an embodiment. FIG. 3B is a perspective view illustrating an electronic device as viewed in a different direction;

An electronic device 301 (e.g., the electronic device 101) may include a housing 303 and a display 360 (e.g., the display device 160). The housing 303 may include a front surface, or a first surface, facing in a first direction and a rear surface 307 (or a second plate) facing in a second direction opposite to the first direction. The rear surface 307 of the housing 303 may be a rear cover.

At least a portion of the front surface of the housing 303 may have an opening. The display 360 may include a transparent cover 361 (or a window, cover glass, or a first plate). The display 360 may be mounted in the housing 303 so that the cover 361 forms at least a portion of the front surface of the electronic device 301/housing 303. The cover 361 may be disposed to close the opening of the front surface of the housing 303.

According to an embodiment, the electronic device 301 may include mechanically-operated buttons, touch keys 11a, 11b, and 11c or a keypad including at least one of the buttons or touch keys on the front surface of the housing 303 or on a side of the display 360. The touch keys 11a, 11b, and 11c may detect the user's touch inputs.

The housing 303 may receive various electronic parts. The housing 303 may be at least partially formed of a conductive material. The housing 303 may include side walls forming the outer surface of the electronic device 301. A printed circuit part (not shown) and/or a battery (e.g., the battery 189) may be received inside the housing 303. For example, at least one of a processor (e.g., the processor 120), a communication module (e.g., the communication module 190), various interfaces (e.g., the interface 177), or a power management module (e.g., the power management module 188) may be mounted on the printed circuit part (not shown) in the form of an integrated chip (IC).

According to an embodiment, the electronic device 301 may include a first camera 12a (e.g., the camera module 180), a light source 12b, or an iris camera 12c on an upper portion of the front surface. For example, the light source 12b may include an infrared (IR) light emitting diode (LED). The iris camera 12c may capture the user's eye or iris irradiated with a red near-infrared ray output from the IR LED.

According to an embodiment, the electronic device 301 may include a light source indicator lamp 12d, an illuminance sensor, and/or a proximity sensor 12e on the upper portion of the front surface.

According to an embodiment, the electronic device 301 may include a second camera 13a (e.g., the camera module 180), a hear rate monitor (HRM) 13d, and/or a flash 13b on the rear surface 307. The electronic device 301 may include a microphone 13c on the top.

The display 360 may be exposed through the front surface of the housing 303. The display 360 may include a cover 361 and a display panel. According to an embodiment, the display 360 may include a touch panel between the cover 361 and the display panel. The display 360 may output a home screen or application screens. The display 360 may detect touch inputs on the home screen or the application screens.

According to an embodiment, the electronic device 301 may include a rear cover to protect the rear surface 307 of the housing 303. The rear cover may be mounted on the housing 303 to face in the opposite direction (the second direction) of the display 360. The rear cover, together with the housing 303 and the display 360, may form the outer appearance of the electronic device 301.

Figure 4A:
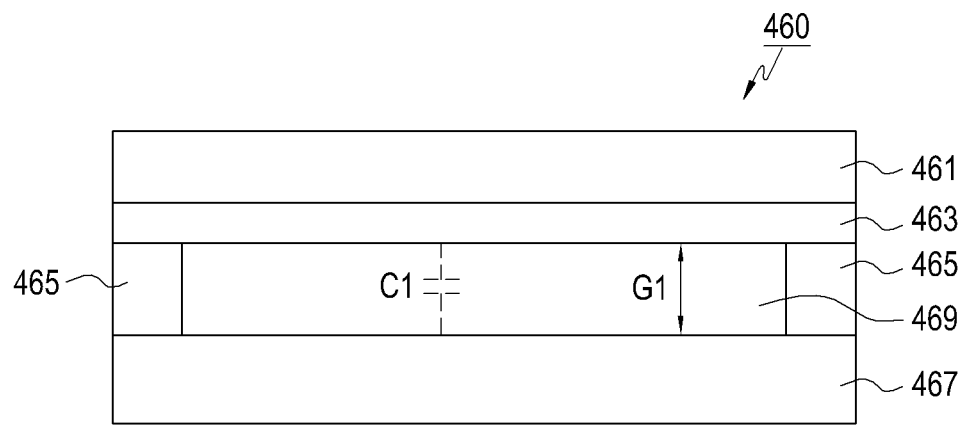
FIGS. 4A and 4B are views illustrating a display according to an embodiment.
Figure 4B:
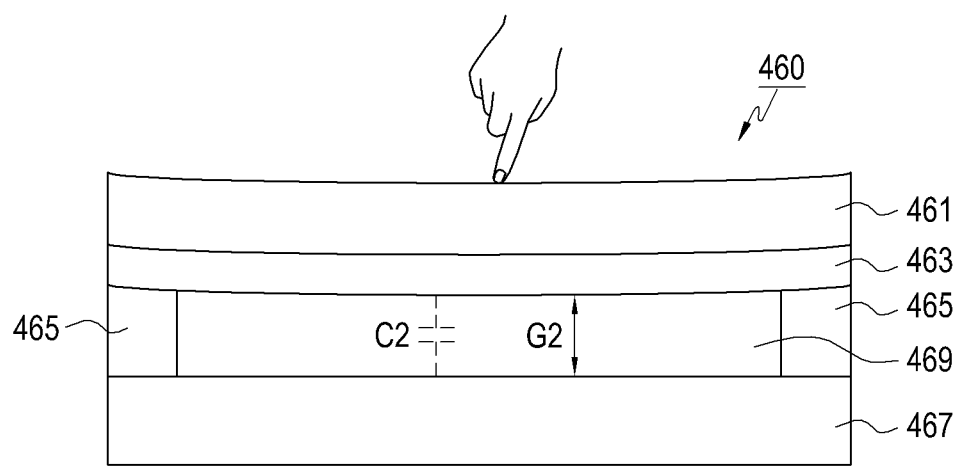

FIGS. 4A and 4B are views illustrating a display according to an embodiment.

A display 460 (e.g., the display device 160 or the display 360) may be mounted in a housing (e.g., the housing 303) of an electronic device (e.g., the electronic device 101 or 301) or may at least partially be disposed in the housing. The display 460 may include a transparent cover 461 (e.g., the cover 361), a touch sensor 463, a spacer 465, and/or a display panel 467.

The cover 461 may be disposed on the front surface of the electronic device or housing (e.g., the housing 303) or may be disposed to form at least a portion of the front surface.

The touch sensor 463 may be disposed on the rear surface of the cover 461. The touch sensor 463 may include a plurality of conductive lines to detect touch/hovering inputs. For example, the conductive lines of the touch sensor 463 may have a linear grid pattern or diamond pattern.

In a first operation mode, the touch sensor 463 may be operated according to first pattern signals of a first capacitive sensing scheme (e.g., a self capacitive sensing scheme or a first detection scheme) and second pattern signals of a second capacitive sensing scheme (e.g., a mutual capacitive sensing scheme or a second detection scheme).

The spacer 465 may space the touch sensor 463 apart from the display panel 467. An air gap 469 of a thickness G1 may be present between the touch sensor 463 and the display panel 467.

According to an embodiment, the spacer 465 may be stacked in a rectangular strap shape on rear edges (or periphery) or front edges (or periphery) of the display panel 467. According to an embodiment, the spacer 465 may be formed of a single body or multiple parts spaced apart from each other. For example, the spacer 465 may be formed of high-density polyurethane foam (e.g., Poron™). As another example, the spacer 465 may be formed of one, or a combination, of an attaching member, e.g., an adhesive, a typical sealant, and a strength member shaped as a sphere, a cylinder, or a polyhedron. For example, the attaching member may include a typical curable material, e.g., an ultraviolet (UV)-curable material. For example, the strength member, which may be a supporting member, may be formed of a metal, such as gold (Au), silver (Ag), or copper (Cu), or a conductive polymer, such as polyacetylene.

The display panel 467 may include a plurality of pixels and may display various types of content (e.g., text, images, videos, icons, or symbols) through the pixels.

According to an embodiment, the display panel 467 may include a plurality of pixels arrayed in a matrix structure of M rows and N columns. Each pixel may include a red (R) sub-pixel, a green (G) sub-pixel, and a blue (B) sub-pixel. The display panel 467 may be configured to allow each pixel to emit light according to a selected combination of the RGB sub-pixels.

According to an embodiment, the display panel 467 may include, e.g., a liquid crystal display (LCD), a light emitting diode (LED) display, an organic light emitting diode (OLED) display, or a microelectromechanical systems (MEMS) display, or an electronic paper display.

A control circuit (e.g., the processor 120, the touch sensor IC 253, or a combination thereof) may provide driving signals to the touch sensor 463 and detect touch/hovering inputs based on signals sensed by the touch sensor 463.

Referring to FIG. 4A, a first capacitance C1 may be produced between the touch sensor 463 and the display panel 467 by driving signals provided to the touch sensor 463.

As a driving signal is applied from the touch sensor 463 to the first capacitance C1, charging/discharging occurs, causing noise. Pressing the cover 461 may change the first capacitance C1, resulting in a variation in the magnitude or tone of the noise. In some cases, noise may be too small to recognize before the cover 461 is pressed, and as the cover 461 is then pressed to vary the capacitance, resonance may occur to increase the noise.

Referring to FIG. 4B, when the user presses or brings the display 460 or the cover 461 in contact with her ear for calling, for example, an amount of force may be applied to the cover 461, varying the thickness of the air gap 469 from the first thickness G1 to a second thickness G2 different from the first thickness G1. When the air gap 469 varies from the first thickness G1 to the second thickness G2, the capacitance between the touch sensor 463 and the display panel 467 may also be varied from the first capacitance C1 to a second capacitance C2, and the variation in capacitance may cause noise. The noise may be reduced or removed according to a variation in the driving signal provided to the touch sensor 463 (e.g., a variation in a mean/peak/maximum voltage level/magnitude/width, or a duty cycle, rise/fall time or frequency of voltage pulses).

Figure 5:
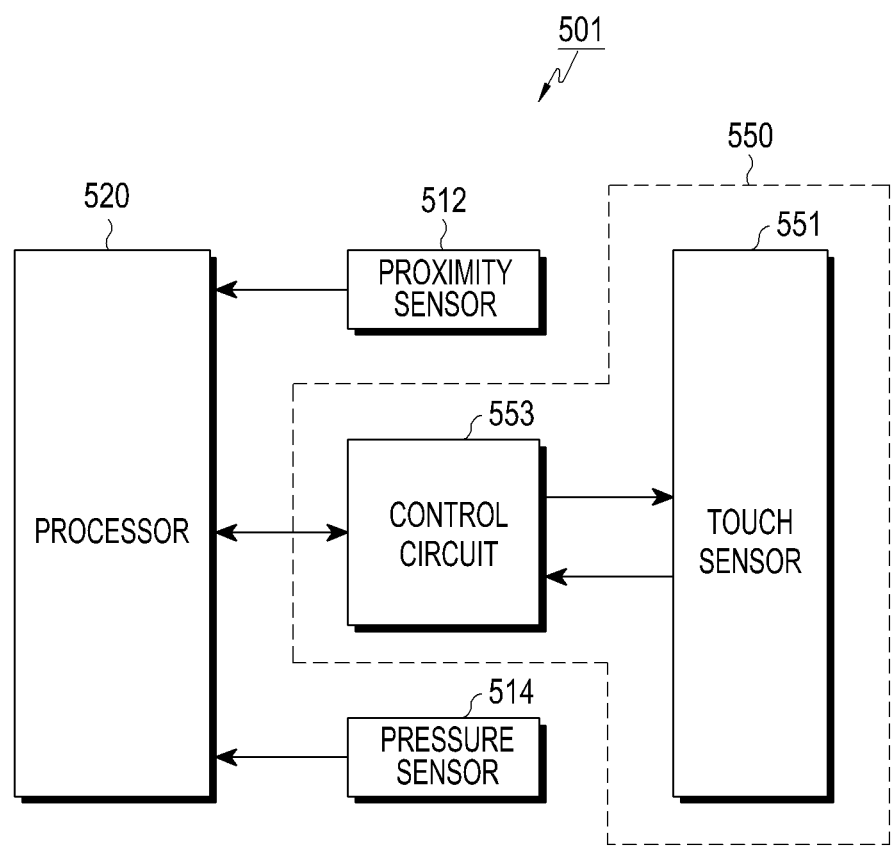
FIG. 5 is a block diagram illustrating an electronic device according to an embodiment.

FIG. 5 is a block diagram illustrating an electronic device according to an embodiment.

An electronic device 501 (e.g., the electronic device 101 or 301) may include a housing (e.g., the housing 303), a proximity sensor 512 (e.g., the proximity sensor 12e), a pressure sensor 514, a processor 520 (e.g., the processor 120), and/or touch circuitry 550 (e.g., the touch circuitry 250). The touch circuitry 550 may include a touch sensor 551 (e.g., the touch sensor 251) and a control circuit 553 (e.g., the touch sensor IC 253).

According to an embodiment, the electronic device 501 may include a display device (e.g., the display device 160 or a touchscreen) having the touch circuitry 550 as its component.

According to an embodiment, the electronic device 301 may omit one of the components or add another component (e.g., the communication module 190 or the memory 130).

The proximity sensor 512 may be configured to detect an object's approach without any physical contact. The processor 520 or the control circuit 553 may obtain information related to the approach detected by the proximity sensor 512. According to an embodiment, when an object approaches within a preset distance, the proximity sensor 512 may output a preset (or approach-related) signal/data to the processor 520 or the control circuit 553. The processor 520 or the control circuit 553 may read signals/data stored in the proximity sensor 512. For example, the proximity sensor 512 may include at least one of a capacitive proximity sensor to sense approach according to variations in capacitance, an inductive proximity sensor to produce a magnetic field through a coil and sense approach according to variations in electric current flowing through the coil, an ultrasonic proximity sensor to radiate an ultrasound wave and detect a reflected ultrasound wave, or a photo proximity sensor to emit an infrared (IR) beam and detect a reflected IR beam.

The pressure sensor 514 may be configured to detect a pressure applied to a display (e.g., the display device 160 or the display 360) or the cover 361. The processor 520 or the control circuit 553 may obtain information related to a pressure detected by the pressure sensor 514. According to an embodiment, upon detecting a pressure of a preset level or more, the pressure sensor 514 may output a preset (or pressure-related) signal/data to the processor 520 or the control circuit 553. Alternatively, the processor 520 or the control circuit 553 may read signals/data stored in the pressure sensor 514.

According to an embodiment, the processor 520 may be configured to detect a first event related to mode switching and output a first control signal related to the mode switching to the control circuit 553 based on the detection of the first event.

The mode switching-related first event may include at least one of detecting a preset state of the electronic device 501, detecting a palm touch using the touch sensor 551, detecting an approaching object using the proximity sensor 512, detecting a touch pressure greater than or equal to a threshold using the pressure sensor 514, executing a preset application (e.g., a communication/phone application), executing a preset function (e.g., communication/phone function), executing a function/application using a receiver, calling/receiving (or outputting a ring tone/vibration) or call connecting.

According to an embodiment, the processor 520 may transmit at least part of approach-related information received from the proximity sensor 512 to the control circuit 553.

According to an embodiment, the processor 520 may transmit at least part of pressure-related information received from the pressure sensor 514 to the control circuit 553.

The touch sensor 551 may be operated according to driving signals received from the control circuit 553. The touch sensor 551 may transmit sensing signals detected from the conductive lines to the control circuit 553. The sensing signals from the touch sensor 551 may represent capacitances, voltages, or currents.

The control circuit 553 may receive sensing signals from the touch sensor 551 and produce touch information based on the sensing signals. The control circuit 553 may transmit the touch information to the processor 520. The processor 520 may perform operations/functions based on the touch information received from the control circuit 553.

The touch information may include at least one of touch positions, touch coordinates, touch pressures, touch areas, touch types, or touch angles.

The control circuit 553 may output a first driving signal to the touch sensor 551 in a first operation mode.

The control circuit 553 may detect a first event related to mode switching and output a second driving signal different from the first driving signal to the touch sensor 551 based on the detection of the first event.

The mode switching-related first event may include at least one of detecting a preset state of the electronic device 501, receiving a first control signal (e.g., an instruction to switch to a second operation mode) related to the mode switching, detecting a palm touch using the touch sensor 551, detecting an approaching object using the proximity sensor 512, detecting a touch pressure greater than or equal to a threshold using the pressure sensor 514, executing a preset application (e.g., a communication/phone application), executing a preset function (e.g., communication/phone function), executing a function/application using a receiver, calling/receiving (or outputting a ring tone/vibration) or call connecting.

According to an embodiment, the second driving signal may have a different mean/peak/maximum voltage level/magnitude/width, duty cycle, voltage pulse rise/fall time, or frequency than a mean/peak/maximum voltage level/magnitude/width, duty cycle, voltage pulse rise/fall time, or frequency of the first driving signal.

According to an embodiment, the first driving signal may include first pattern signals according to a first capacitive sensing scheme and second pattern signals according to a second capacitive sensing scheme, and the second driving signal may only include the second pattern signals according to the second capacitive sensing scheme.

According to an embodiment, an electronic device may comprise a housing including a first plate and a second plate positioned opposite the first plate, a display positioned between the first plate and the second plate, a touch sensing panel positioned between the display and the first plate, spaced apart from the display by an air gap, and including a plurality of first conductive lines extending in a first direction and a plurality of second conductive lines extending in a different direction from the first direction as viewed from the first plate and crossing the plurality of first conductive lines, a wireless communication circuit, at least one processor functionally connected with the display, the panel, and the wireless communication circuit, and a memory functionally connected with the processor, wherein the memory may store instructions executed to enable the processor to detect an external object above or near the first plate; in a first operation, alternately use a first detection scheme and a second detection scheme, the first detection scheme detecting, independently, variations in capacitances of the plurality of first conductive lines and the plurality of second conductive lines during a first time period, and the second detection scheme providing voltages to the plurality of first conductive lines and measuring voltages at the plurality of second conductive lines during a second time period; and in a second operation, alternately use a modified first detection scheme and the second detection scheme or use the second detection scheme alone.

According to an embodiment, the instructions may be executed to enable the processor to determine a state of the electronic device and switch between the first operation and the second operation based on at least part of the state.

According to an embodiment, the electronic device may further comprise a speaker exposed through the first plate; and a proximity sensor position near the speaker, wherein the instructions may be executed to enable the processor to determine the state of the electronic device using the proximity sensor.

According to an embodiment, the instructions may be executed to enable the processor to determine the state of the electronic device using the proximity sensor upon receiving a call through the wireless communication circuit.

According to an embodiment, the first detection scheme and the modified first detection scheme may differ from each other in a frequency and/or voltages of signals provided to the plurality of first conductive lines and/or the plurality of second conductive lines.

According to an embodiment, touch circuitry 550 may include a touch sensor 551 and a control circuit 553 electrically connected with the touch sensor 551. The control circuit 553 may be configured to provide a first driving signal to the touch sensor 551 in a first operation mode, detect a first event related to mode switching, and provide a second driving signal different from the first driving signal to the touch sensor 551 in a second operation mode based on detecting the first event.

According to an embodiment, an electronic device 501 may comprise a housing (e.g., the housing 303) and touch circuitry 550 mounted inside the housing or at least partially disposed inside the housing and configured to detect a touch or hovering. The touch circuitry 550 may be configured to operate in a first operation mode and according to a first driving signal, detect a first event related to mode switching, and operate in a second operation mode and according to a second driving signal different from the first driving signal based on detecting the first event.

According to an embodiment, the second driving signal may have a different mean/peak/maximum voltage level/magnitude/width, duty cycle, or voltage pulse rise/fall time than a mean/peak/maximum voltage level/magnitude/width, duty cycle, or voltage pulse rise/fall time of the first driving signal.

According to an embodiment, the second driving signal may have a different frequency from a frequency of the first driving signal.

According to an embodiment, the first driving signal may include first pattern signals of a first capacitive sensing scheme (or a first detection scheme) and second pattern signals of a second capacitive sensing scheme (or a second detection scheme).

According to an embodiment, the second driving signal may include second pattern signals of the second capacitive sensing scheme.

According to an embodiment, the second driving signal may include third pattern signals of the first capacitive sensing scheme (or a modified first detection scheme) and the second pattern signals of the second capacitive sensing scheme.

According to an embodiment, the first capacitive sensing scheme may be a self capacitive sensing scheme, and the second capacitive sensing scheme may be a mutual capacitive sensing scheme.

According to an embodiment, the third pattern signals may have a different mean/peak/maximum voltage level/magnitude/width, duty cycle, or voltage pulse rise/fall time than a mean/peak/maximum voltage level/magnitude/width, duty cycle, or voltage pulse rise/fall time of the first pattern signals.

According to an embodiment, the third pattern signals may have a different frequency from a frequency of the third pattern signals.

According to an embodiment, the total number of the third pattern signals may differ from the total number of the first pattern signals during one period.

According to an embodiment, the mode switching-related event may include detecting a palm touch.

According to an embodiment, the first event related to the mode switching includes at least one of detecting a preset state of the electronic device, receiving a first control signal related to the mode switching, detecting a palm touch, detecting an approaching object by a proximity sensor 512, detecting a touch pressure greater than or equal to a threshold, executing a preset application, executing a preset function, call reception, or call connection.

According to an embodiment, the touch circuitry 550 may be configured to detect a second event related to mode switching and switch an operation mode of the touch circuitry 550 from the second operation mode to the first operation mode based on detecting the second event.

According to an embodiment, the second event related to the mode switching may include at least one of releasing the detection of a preset state of the electronic device, receiving a second control signal related to the mode switching, releasing a palm touch, releasing detection of an approach by the proximity sensor 512, releasing a touch pressure greater than or equal to a threshold, terminating a preset application, terminating a preset function, releasing call reception, or releasing call connection.

Figure 6:
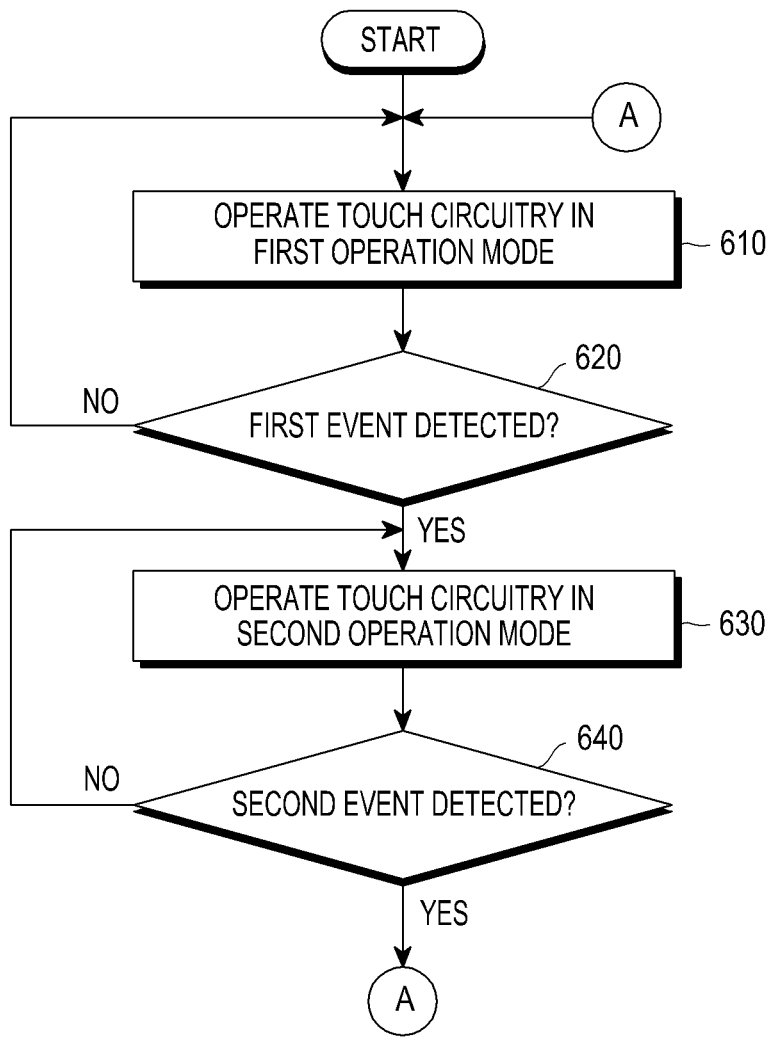
FIG. 6 is a flowchart illustrating a method for changing modes of an electronic device according to an embodiment.

FIG. 6 is a flowchart illustrating a method for changing modes of an electronic device according to an embodiment. The mode changing method may include operations 610 to 640. Each step/operation of the mode changing method may be performed by at least one of an electronic device (e.g., the electronic device 101, 301, or 501), at least one processor (e.g., the processor 120 or 520) of the electronic device, touch circuitry (e.g., the touch circuitry 250 or 550/control circuit (e.g., the touch sensor IC 253 or 553)), or a controller/control circuit (e.g., the processor 120 or 520) and/or touch circuitry (e.g., the touch circuitry 250 or 550/control circuit (e.g., the touch sensor IC 253 or 553)) of the electronic device. According to an embodiment, at least one of operations 610 to 640 may be omitted or changed in order or may add other operations.

In operation 610, the electronic device (e.g., the processor or touch circuitry/control circuit) may operate in a first operation mode.

In the first operation mode, the control circuit may periodically (or at regular intervals) provide first driving signals to a touch sensor (e.g., the touch sensor 251 or 551). According to an embodiment, the first driving signals may include first pattern signals of a first capacitive sensing scheme (e.g., a self capacitive sensing scheme or a first detection scheme) and second pattern signals of a second capacitive sensing scheme (e.g., a mutual capacitive sensing scheme or a second detection scheme). According to an embodiment, in the first operation mode, the control circuit may sequentially and individually provide the first pattern signals of the self capacitive sensing scheme to the conductive lines (e.g., X-axis (or TX) lines and Y-axis (or RX) lines) of the touch sensor. The control circuit may obtain first touch information based on first sensing signals detected at the conductive lines (e.g., X-axis (or TX) lines and Y-axis (or RX) lines). In the first operation mode, the control circuit may sequentially and individually provide the second pattern signals of the mutual capacitive sensing scheme to at least some (or at least a portion) (e.g., X-axis (or TX) lines) of the conductive lines of the touch sensor. In the first operation mode, the control circuit may obtain second touch information based on second sensing signals detected at conductive lines (e.g., Y-axis (or RX) lines). In the first operation mode, the control circuit may transmit the first and second touch information to the processor. In the first operation mode, the processor may perform operations/functions based on the first and second touch information received from the control circuit.

In operation 620, the electronic device (e.g., the processor or touch circuitry/control circuit) may identify whether a first event related to mode switching is detected/occurs. The electronic device may perform operation 630 upon detecting the first event, and if not, operation 610. The first event may include at least one of detecting a preset state of the electronic device, receiving a first control signal (e.g., an instruction to switch to a second operation mode) related to the mode switching, detecting a palm touch, detecting an approaching object using the proximity sensor (e.g., the proximity sensor 12e or 512), detecting a touch pressure greater than or equal to a threshold, executing a preset application (e.g., a communication/phone application), executing a preset function (e.g., communication/phone function), executing a function/application using a receiver, calling/receiving (or outputting a ring tone/vibration) or call connecting.

In operation 630, the electronic device (e.g., the processor or touch circuitry/control circuit) may operate in a second operation mode.

In the second operation mode, the control circuit may periodically (or at regular intervals) provide second driving signals to the touch sensor. According to an embodiment, the second driving signals may include third pattern signals of the first capacitive sensing scheme (or a modified first detection scheme) and/or second pattern signals of the second capacitive sensing scheme. According to an embodiment, the second driving signals may not include signals of the first capacitive sensing scheme but may include second pattern signals. According to an embodiment, in the second operation mode, the control circuit may sequentially provide the second pattern signals of the mutual capacitive sensing scheme to at least some (or at least a portion) (e.g., X-axis (or TX) lines) of the conductive lines of the touch sensor. In the second operation mode, the control circuit may obtain touch information based on second sensing signals detected at others (e.g., Y-axis (or RX) lines) of the conductive lines. In the second operation mode, the control circuit may transmit the touch information to the processor. In the second operation mode, the processor may perform operations/functions based on the information received from the control circuit.

In operation 640, the electronic device (e.g., the processor or touch circuitry/control circuit) may identify whether a second event related to mode switching is detected/occurs. The electronic device may perform operation 610 upon detecting the second event, and if not, operation 630. The second event may include at least one of releasing the detection of the preset state of the electronic device, receiving a mode switching-related second control signal (e.g., an instruction to switch into the first operation mode), releasing the palm touch, releasing detection of the approach by the proximity sensor, releasing the touch pressure greater than or equal to the threshold, terminating the execution of the preset application, terminating the execution of the preset function, releasing the call reception, or releasing the call connection.

According to an embodiment, the mode switching method of the electronic device may include providing a first driving signal to a touch sensor in a first operation mode, detecting a first event related to mode switching, and providing a second driving signal different from the first driving signal to the touch sensor in a second operation mode based on detecting the first event.

According to an embodiment, the first driving signal may include first pattern signals of a first capacitive sensing scheme (or a first detection scheme) and second pattern signals of a second capacitive sensing scheme (or a second detection scheme).

According to an embodiment, the first capacitive sensing scheme may be a self capacitive sensing scheme, and the second capacitive sensing scheme may be a mutual capacitive sensing scheme.

According to an embodiment, the second driving signal may include third pattern signals of the first capacitive sensing scheme (or a modified first detection scheme) and the second pattern signals of the second capacitive sensing scheme.

According to an embodiment, the third pattern signals may have a different mean/peak/maximum voltage level/magnitude/width, duty cycle, voltage pulse rise/fall time, or frequency than a mean/peak/maximum voltage level/magnitude/width, duty cycle, voltage pulse rise/fall time, or frequency of the first pattern signals.

Figure 7A:
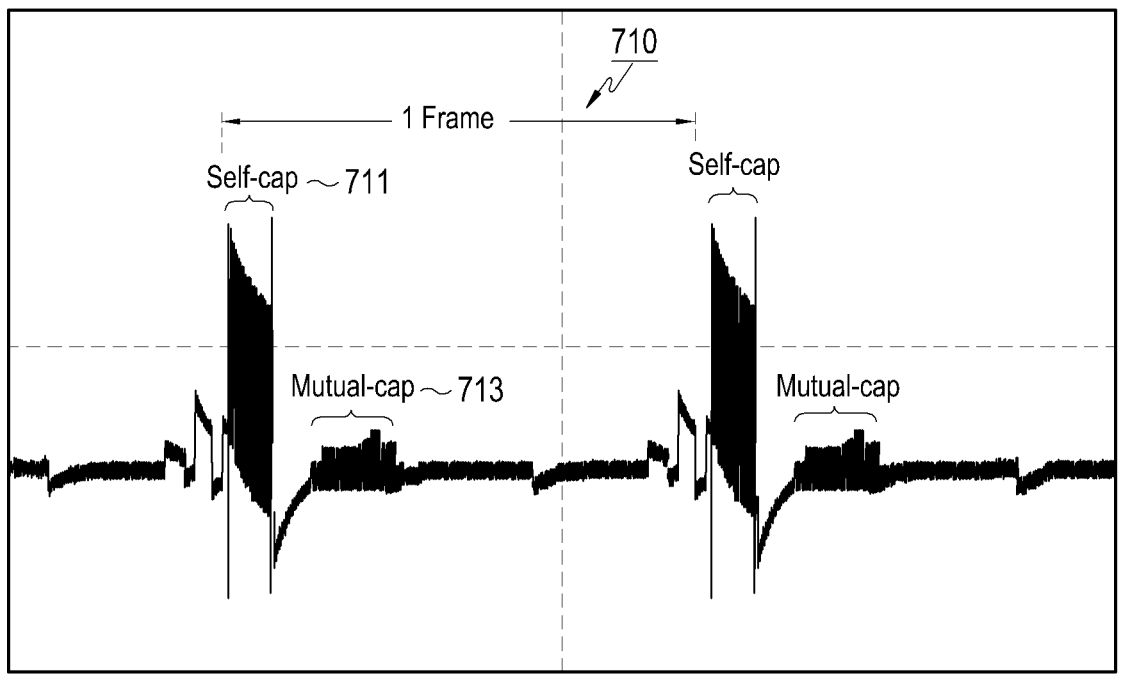
FIGS. 7A and 7B are views illustrating driving signals according to an embodiment.
Figure 7B:
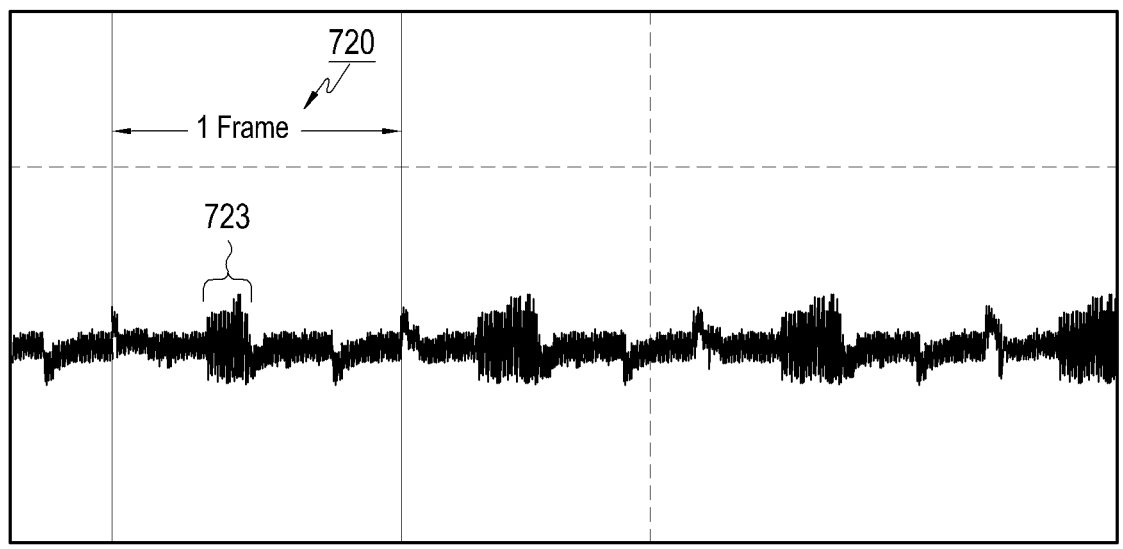

FIGS. 7A and 7B are views illustrating driving signals according to an embodiment.

Referring to FIG. 7A, first driving signals may include first pattern signals 711 according to a first capacitive sensing scheme (e.g., a self capacitive sensing scheme) and second pattern signals 713 according to a second capacitive sensing scheme (e.g., a mutual capacitive sensing scheme). In the first operation mode, the control circuit (e.g., the touch sensor IC 253 or 553) may periodically (or at regular intervals) provide the first driving signals to a touch sensor (e.g., the touch sensor 251 or 551). During first time periods of all/each frames/periods (corresponding to, e.g., 60 to 120 frame frequencies) periodically (or at regular intervals) recurring, the control circuit may sequentially and individually provide the first pattern signals 711 to the conductive lines (e.g., X-axis (or TX) lines) and Y-axis (or RX) lines) of the touch sensor. During second time periods of all/each the frames/periods periodically (or at regular intervals) recurring after providing the first pattern signals 711, the control circuit may sequentially and individually provide the second pattern signals 713 to at least some (or at least a portion) (e.g., X-axis (or TX) lines) of the conductive lines of the touch sensor.

Referring to FIG. 7B, the second driving signal 720 may only include the second pattern signals of the second capacitive sensing scheme. In the second operation mode, the control circuit may periodically (or at regular intervals) provide second driving signals to the touch sensor. During one frame/period, the control circuit may sequentially and individually provide the second pattern signals 723 to at least some (or at least a portion) (e.g., X-axis (or TX) lines) of the conductive lines of the touch sensor. For example, when the second driving signal is configured to only include the second pattern signals 723 of the second capacitive sensing scheme, a noise reduction of about −6 dB may be achieved in a frequency range from 100 Hz to 1 kHz. The frame/period of the first driving signal 710 shown in FIG. 7A may be the same or different from the frame/period of the second driving signal 720 shown in FIG. 7B.

Figure 8A:
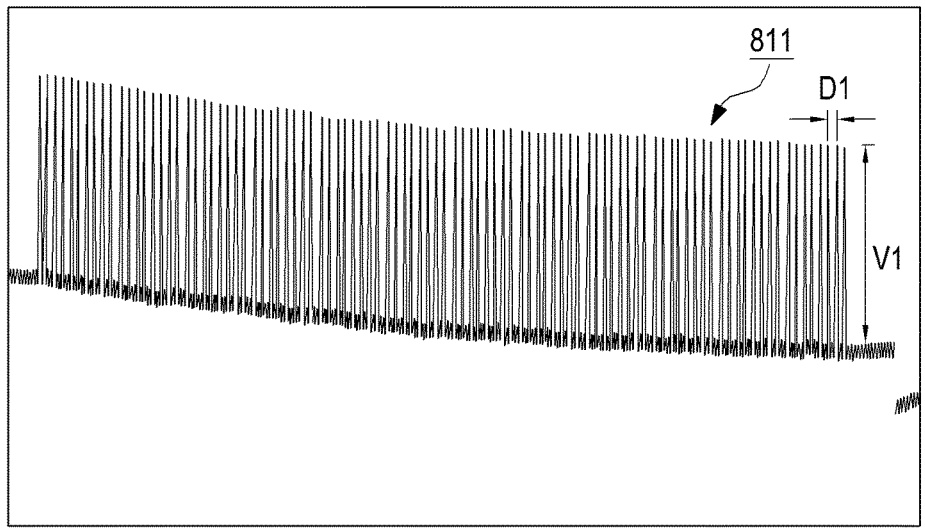
FIGS. 8A-8C are views illustrating driving signals according to an embodiment.
Figure 8B:
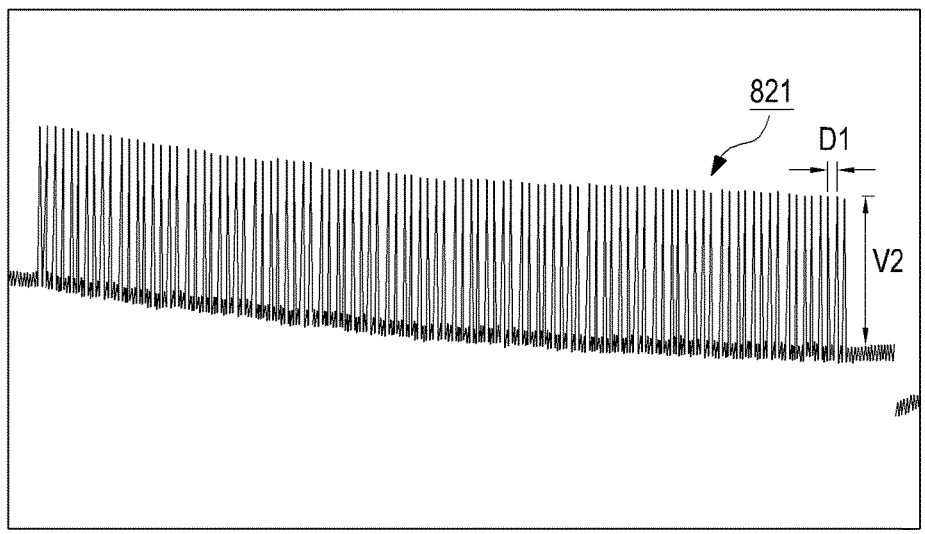
Figure 8C:
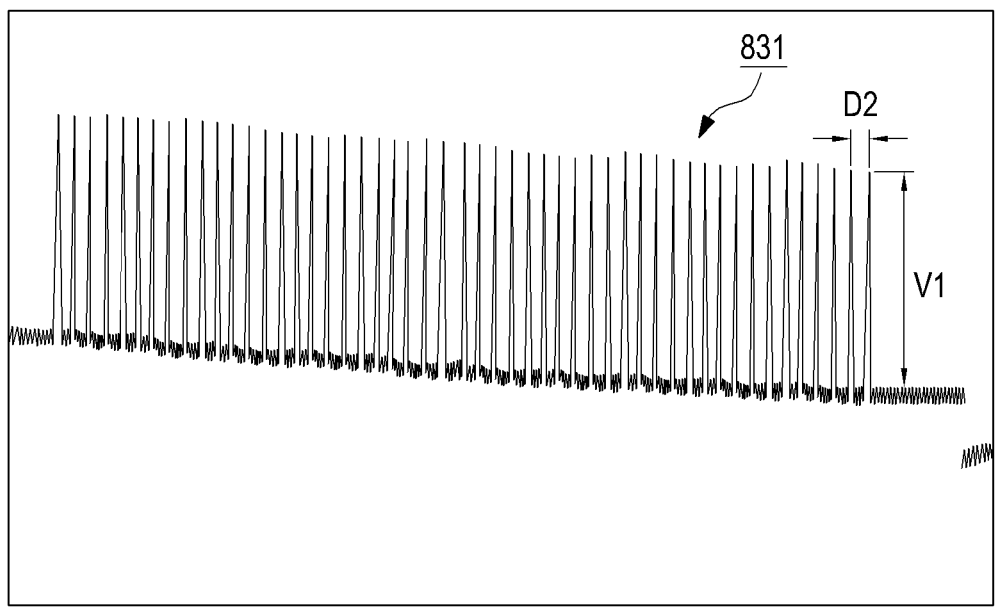

FIGS. 8A, 8B, and 8C are views illustrating driving signals according to an embodiment.

Referring to FIG. 8A, a first driving signal may include first pattern signals 811 according to a first capacitive sensing scheme (e.g., a self capacitive sensing scheme) and second pattern signals (not shown) according to a second capacitive sensing scheme (e.g., a mutual capacitive sensing scheme). The first pattern signals 811 may have a first voltage level/magnitude V1, a first interval D1, and a first frequency (total number of signals per unit time).

Referring to FIG. 8B, a second driving signal may include third pattern signals 821 of the first capacitive sensing scheme (e.g., a self capacitive sensing scheme) and second pattern signals (not shown) according to the second capacitive sensing scheme (e.g., a mutual capacitive sensing scheme). The third pattern signals 821 may have a second voltage/magnitude V2 (e.g., 30% to 70%, or 40% to 60%, of the first voltage level/magnitude V1) smaller than the first voltage level/magnitude V1, the first interval D1, and the first frequency (total number of signals per unit time).

Referring to FIG. 8C, a second driving signal may include fourth pattern signals 831 of the first capacitive sensing scheme (e.g., a self capacitive sensing scheme) and second pattern signals (not shown) according to the second capacitive sensing scheme (e.g., a mutual capacitive sensing scheme). The fourth pattern signals 831 may have the first voltage level/magnitude V1, a second interval D2 larger than the first interval D1, and a second frequency (e.g., 30% to 70%, or 40% to 60%, of the first frequency) smaller than the first frequency.

FIGS. 9A to 9D are views illustrating a method for operating an electronic device according to an embodiment.

Figure 9A:
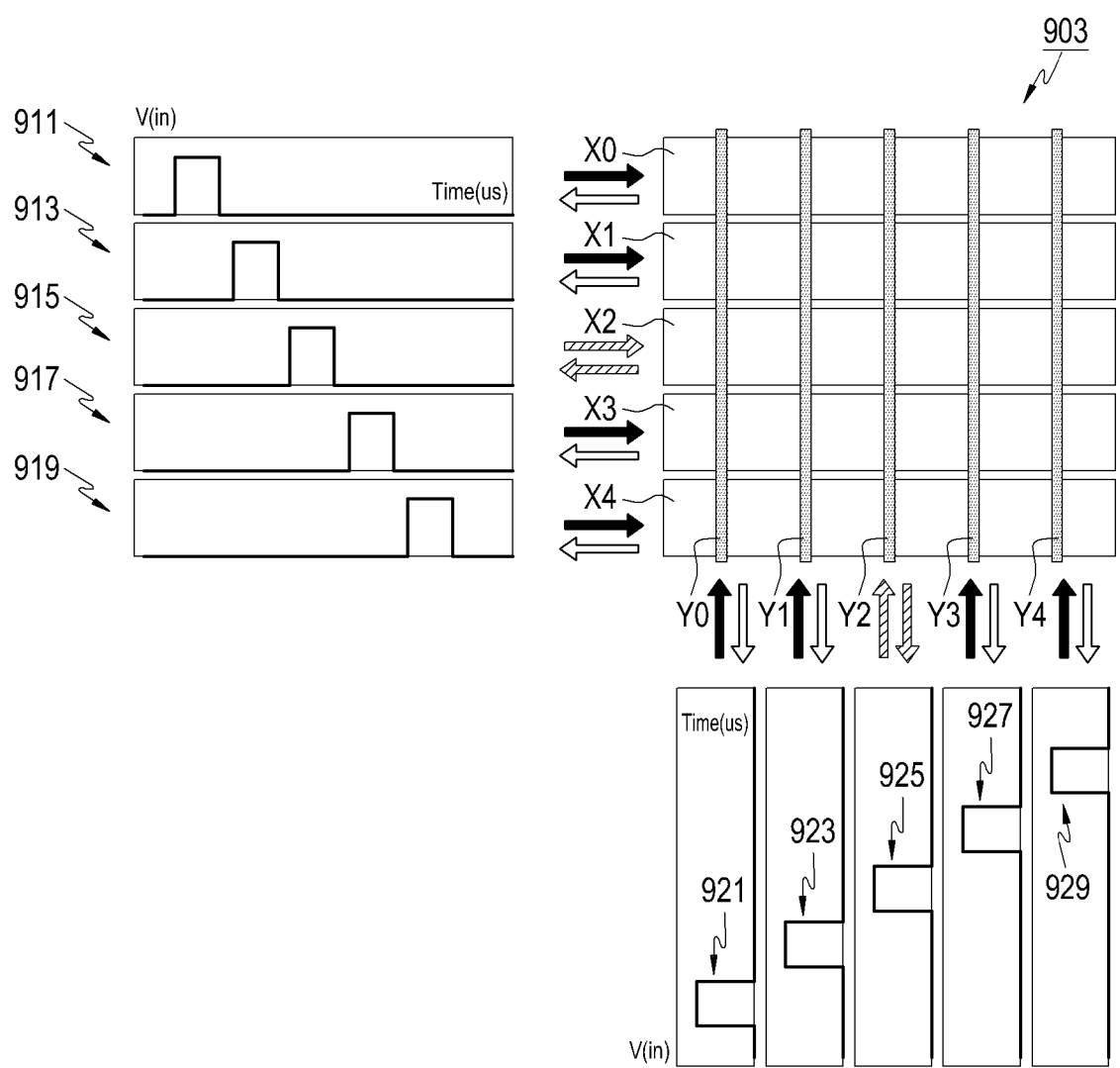
FIGS. 9A-9D are views illustrating a method for operating an electronic device according to an embodiment.

Referring to FIG. 9A, a touch sensor 903 (e.g., the touch sensor 251 or 551) may include a plurality of conductive lines to detect touch/hovering inputs. For example, the touch sensor 903 may include first to fifth X-axis lines X0, X1, X2, X3, and X4 and first to fifth Y-axis lines Y0, Y1, Y2, Y3, and Y4. A control circuit (e.g., the touch sensor IC 253 or 553) may sequentially and individually provide first pattern signals 911, 913, 915, 917, and 919 of a first capacitive sensing scheme (e.g., a self capacitive sensing scheme) to the first to fifth X-axis lines X0, X1, X2, X3, and X4. When no touch input is made to the touch sensor 903, sensing signals detected at the first to fifth X-axis lines X0, X1, X2, X3, and X4 may have the same voltage level/magnitude/waveform. The control circuit (e.g., the touch sensor IC 253 or 553) may sequentially and individually provide first pattern signals 921, 923, 925, 927, and 929 of the first capacitive sensing scheme to the first to fifth Y-axis lines Y0, Y1, Y2, Y3, and Y4. When no touch input is made to the touch sensor 903, sensing signals detected at the first to fifth Y-axis lines Y0, Y1, Y2, Y3, and Y4 may have the same voltage level/magnitude/waveform.

Figure 9B:
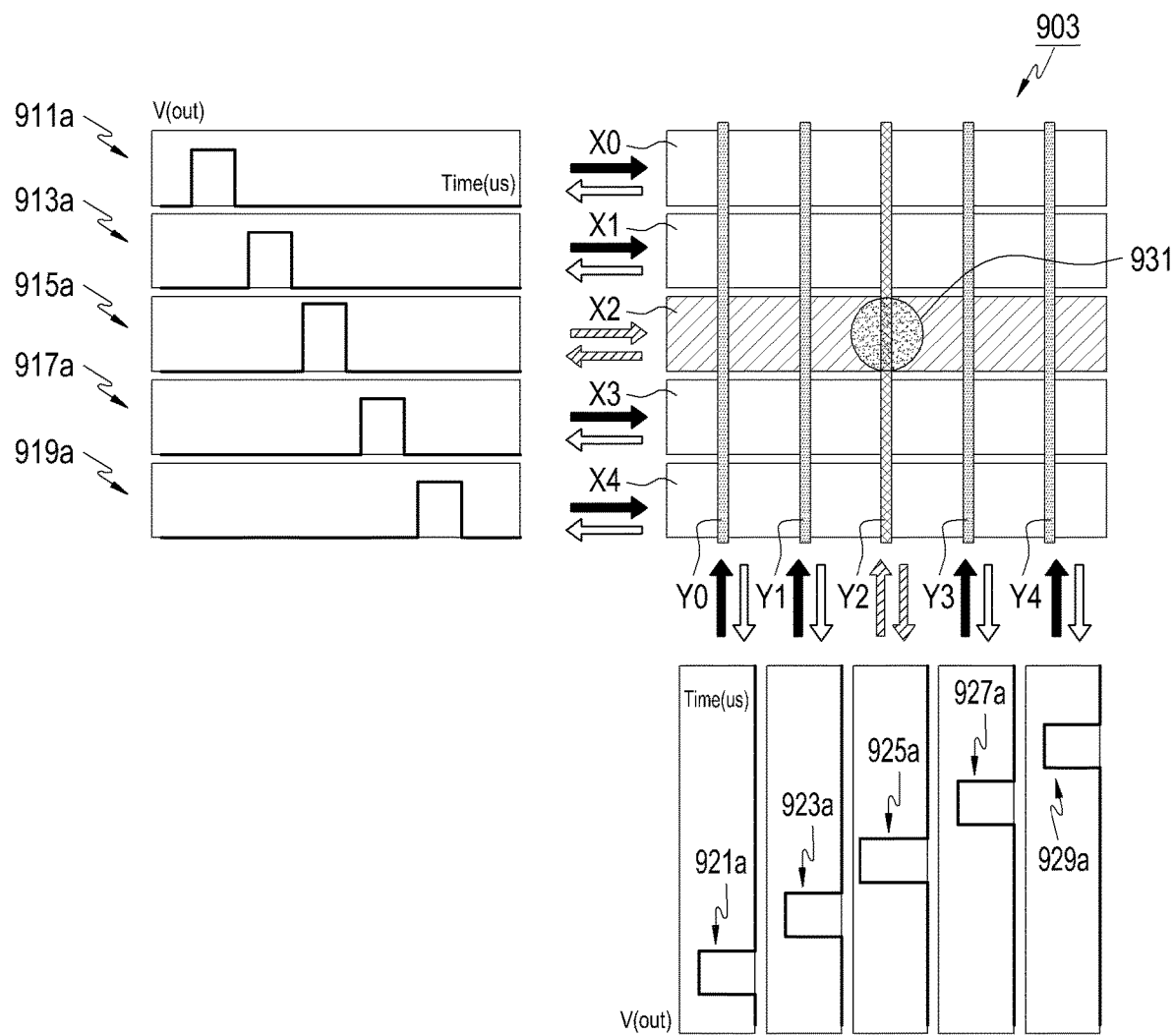

Referring to FIG. 9B, when a touch input 931 is made to the touch sensor 903, a sensing signal 915a detected at the third X-axis line X2 may have a different level/magnitude/waveform from sensing signals 911a, 913a, 917a, and 919a detected at the other X-axis lines X0, X1, X3, and X4. When a touch input 931 is made to the touch sensor 903, a sensing signal 925a detected at the third Y-axis line Y2 may have a different level/magnitude/waveform from sensing signals 921a, 923a, 927a, and 929a detected at the other Y-axis lines Y0, Y1, Y3, and Y4. The control circuit may determine the crossing of the third X-axis line X2 and the third Y-axis line Y2 as the position of the touch based on the variation in voltage level/magnitude/waveform of the sensing signal 915a detected at the third X-axis line X2 and the sensing signal 925a detected at the third Y-axis line Y2.

Figure 9C:
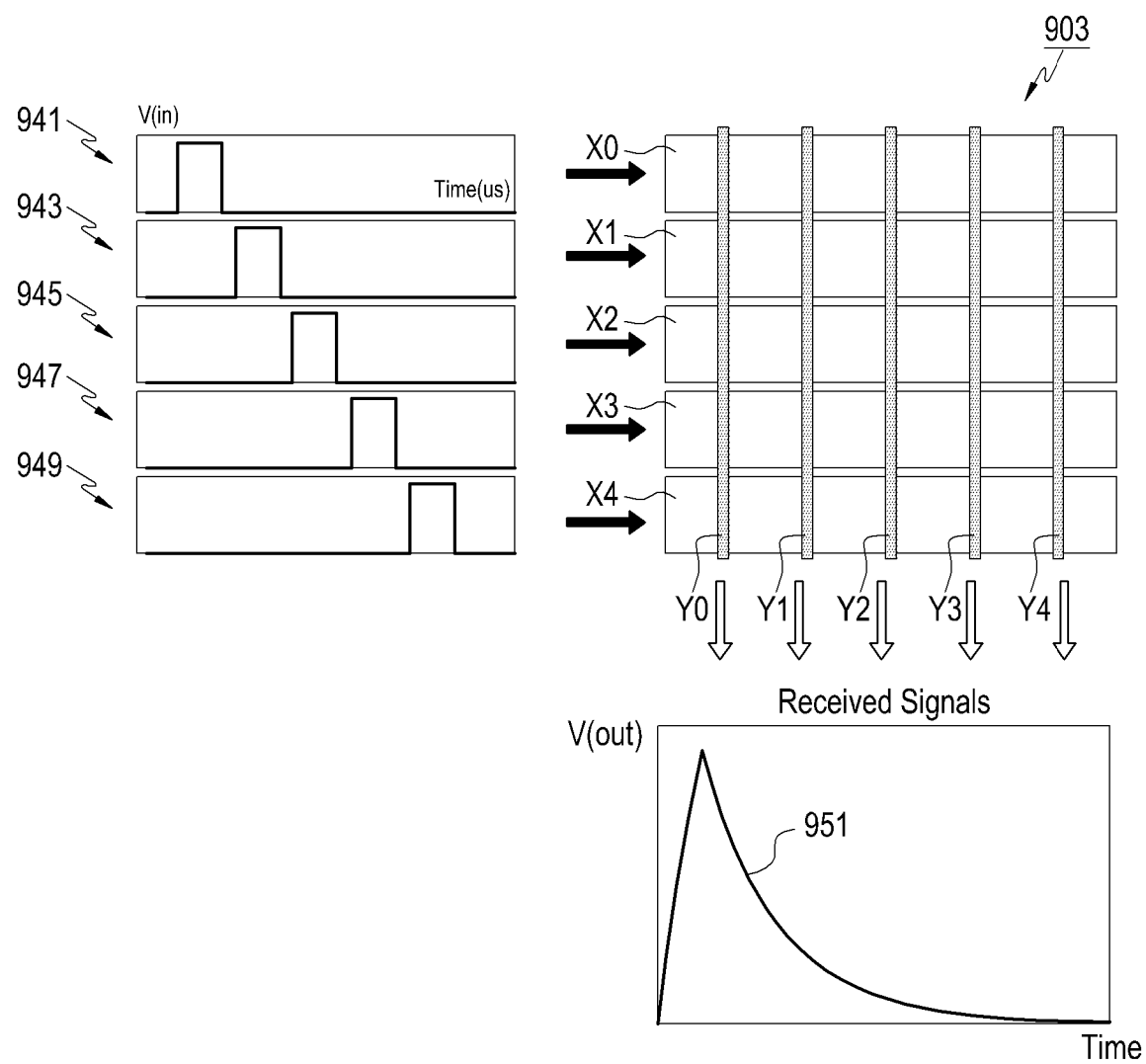

Referring to FIG. 9C, the control circuit (e.g., the touch sensor IC 253 or 553) may sequentially and individually provide second pattern signals 941, 943, 945, 947, and 949 of a second capacitive sensing scheme (e.g., a mutual capacitive sensing scheme) to the first to fifth X-axis lines X0, X1, X2, X3, and X4. In the second capacitive sensing scheme, sensing signals may simultaneously be detected at the first to fifth Y-axis lines Y0, Y1, Y2, Y3, and Y4 corresponding to providing the signal to one of the X-axis lines. When no touch input is made to the touch sensor 903, sensing signals detected at the first to fifth Y-axis lines Y0, Y1, Y2, Y3, and Y4 may have the same voltage level/magnitude/waveform 951.

Figure 9D:
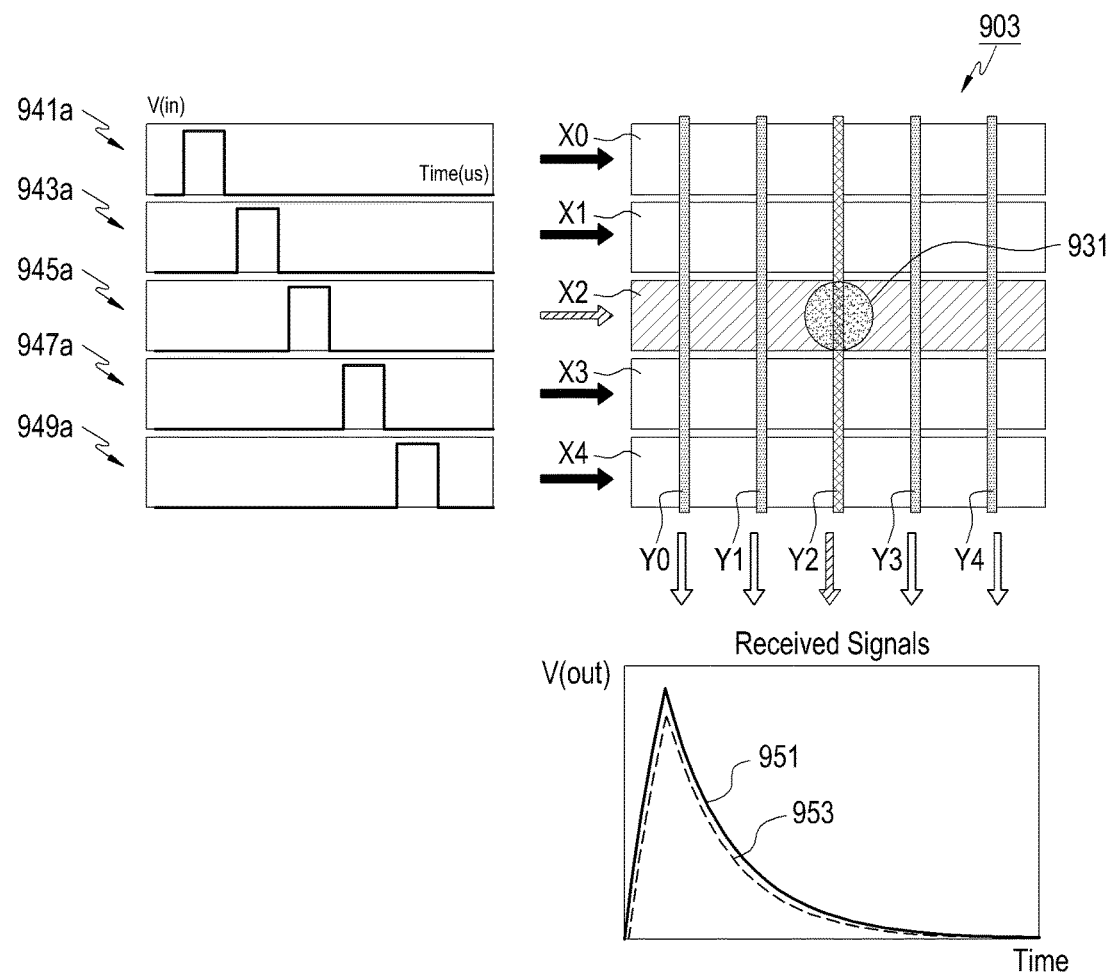

Referring to FIG. 9D, when a touch input 931 is made to the touch sensor 903, a sensing signal detected at the third Y-axis line Y2 may have a different level/magnitude/waveform 953 from the voltage level/magnitude/waveform 951 of sensing signals detected at the other Y-axis lines Y0, Y1, Y3, and Y4. The control circuit may determine the crossing of the third X-axis line X2 and the third Y-axis line Y2 as the position of the touch based on the variation in voltage level/magnitude/waveform 953 of the sensing signal detected at the third Y-axis line Y2.

Figure 10:
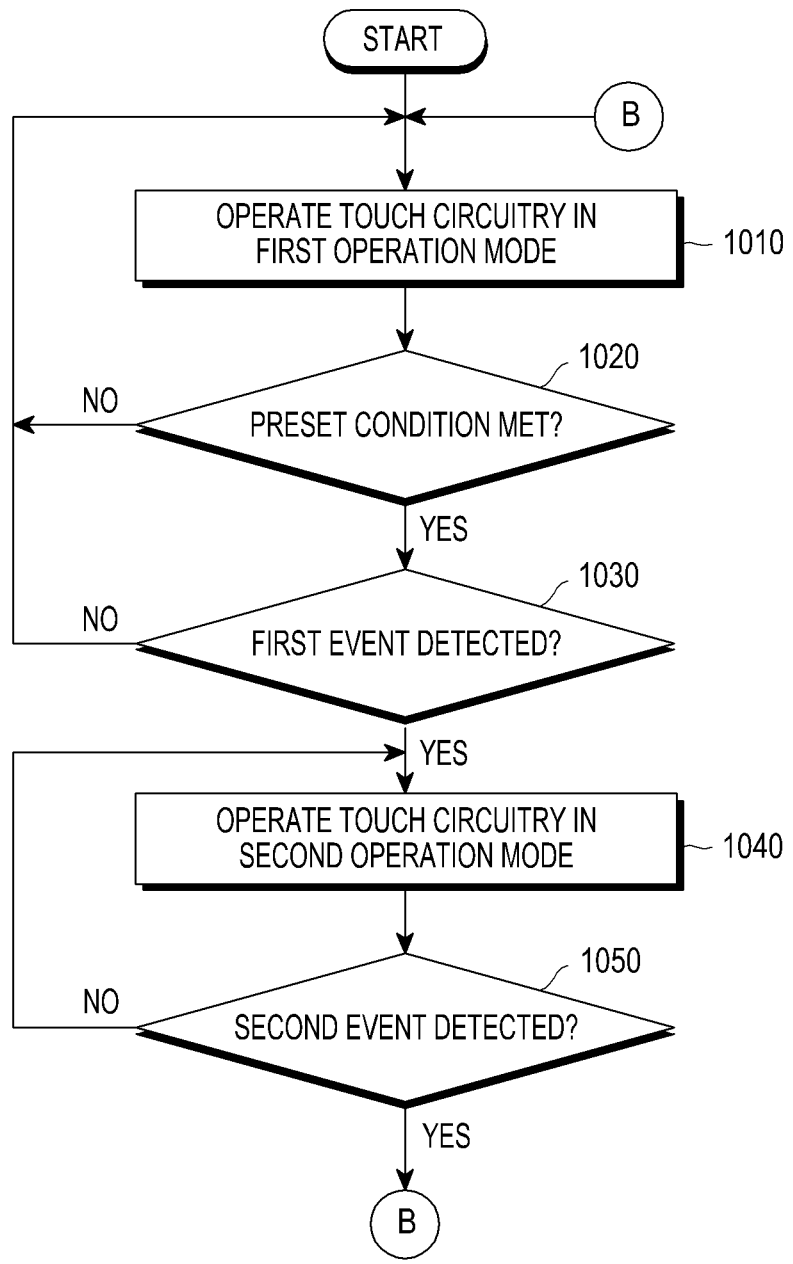
FIG. 10 is a flowchart illustrating a method for changing modes of an electronic device according to an embodiment.

FIG. 10 is a flowchart illustrating a method for changing modes of an electronic device according to an embodiment. The mode changing method may include operations 1010 to 1050. Each step/operation of the mode changing method may be performed by at least one of an electronic device (e.g., the electronic device 101, 301, or 501), at least one processor (e.g., the processor 120 or 520) of the electronic device, touch circuitry (e.g., the touch circuitry 250 or 550/control circuit (e.g., the touch sensor IC 253 or 553)), or a controller/control circuit (e.g., the processor 120 or 520) and/or touch circuitry (e.g., the touch circuitry 250 or 550/control circuit (e.g., the touch sensor IC 253 or 553)) of the electronic device. According to an embodiment, at least one of operations 1010 to 1050 may be omitted or changed in order or may add other operations.

Operations 610, 620, 630, and 640 of the mode changing method shown in FIG. 6 may correspond to operations 1010, 1030, 1040, and 1050, respectively, of the mode changing method, and thus, no repetitive description is presented below.

In operation 1010, the electronic device (e.g., the processor or touch circuitry/control circuit) may operate in a first operation mode.

In the first operation mode, the control circuit may periodically (or at regular intervals) provide first driving signals to a touch sensor (e.g., the touch sensor 251 or 551). According to an embodiment, the first driving signals may include first pattern signals of a first capacitive sensing scheme (e.g., a self capacitive sensing scheme and second pattern signals of a second capacitive sensing scheme (e.g., a mutual capacitive sensing scheme).

In operation 1020, the electronic device (e.g., the processor or the touch circuitry/control circuit) may determine whether a preset condition is met.

The electronic device may perform operation 1030 when the condition is met and perform operation 1010 unless the condition is met.

According to an embodiment, the condition may include at least one of detecting a circumstance preset on the electronic device, executing a preset application (e.g., a communication/phone application), selecting a graphical element (or item, such as a button, icon, menu, or menu item) requiring the operation of a speaker/receiver, receiving an instruction/signal requiring the operation of the speaker/receiver, executing a user input/instruction or a preset function (e.g., a communication/phone function), executing a function/application using the receiver, call dispatch/reception (or ring tone/vibration output) or call connection.

In one embodiment, the preset context for the electronic device may include at least one of the electronic device being positioned or reaching a preset area/place, reaching a preset time, the electronic device operating according to a preset operation pattern (e.g., executing an application(s)), or the current status (e.g., the battery status, wireless signal reception status, or memory status) of the electronic device matching a preset status.

According to an embodiment, the circumstance preset on the electronic device may be determined based on the use history information about the electronic device.

In operation 1030, the electronic device (e.g., the processor or touch circuitry/control circuit) may identify whether a first event related to mode switching is detected/occurs. The electronic device may perform operation 1040 upon detecting the first event, and if not, operation 1010. The first event may include at least one of detecting a preset state of the electronic device, receiving a first control signal (e.g., an instruction to switch to a second operation mode) related to the mode switching, detecting a palm touch, detecting an approaching object using the proximity sensor (e.g., the proximity sensor 12e or 512), or detecting a touch pressure greater than or equal to a threshold.

In operation 1040, the electronic device (e.g., the processor or touch circuitry/control circuit) may operate in a second operation mode.

In the second operation mode, the control circuit may periodically (or at regular intervals) provide second driving signals to the touch sensor. According to an embodiment, the second driving signals may include third pattern signals of the first capacitive sensing scheme and/or second pattern signals of the second capacitive sensing scheme. According to an embodiment, the second driving signals may not include signals of the first capacitive sensing scheme but may include second pattern signals. According to an embodiment, in the second operation mode, the control circuit may sequentially provide the second pattern signals of the mutual capacitive sensing scheme to at least some (or at least a portion) (e.g., X-axis (or TX) lines) of the conductive lines of the touch sensor. In the second operation mode, the control circuit may obtain touch information based on second sensing signals detected at others (e.g., Y-axis (or RX) lines) of the conductive lines. In the second operation mode, the control circuit may transmit the touch information to the processor. In the second operation mode, the processor may perform operations/functions based on the information received from the control circuit.

In operation 1050, the electronic device (e.g., the processor or touch circuitry/control circuit) may identify whether a second event related to mode switching is detected/occurs. The electronic device may perform operation 1010 upon detecting the second event, and if not, operation 1040. The second event may include at least one of releasing the detection of the preset state of the electronic device, receiving a mode switching-related second control signal (e.g., an instruction to switch into the first operation mode), releasing the palm touch, releasing detection of the approach by the proximity sensor, releasing the touch pressure greater than or equal to the threshold, releasing the preset condition, terminating the execution of the preset application, terminating the execution of the preset function, releasing the call reception, or releasing the call connection.

Figure 11:
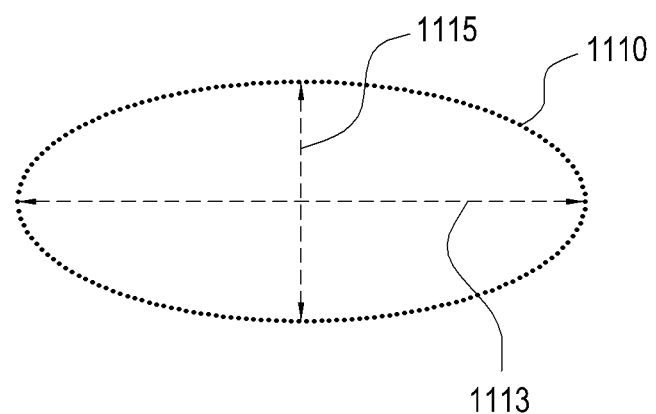
FIG. 11 is a view illustrating a method for recognizing a palm touch on an electronic device according to an embodiment.

FIG. 11 is a view illustrating a method for recognizing a palm touch on an electronic device according to an embodiment.

A processor (e.g., the processor 120 or 520) of an electronic device (e.g., the electronic device 101, 301, or 501) or touch circuitry (e.g., the touch circuitry 250 or 550)/control circuit (e.g., the touch sensor IC 253 or 553) of the electronic device may detect an area 1110 where a touch is made on a display (e.g., the display device 160 or the display 360). For example, the processor or the touch circuitry/control circuit may determine whether the touched area 1110 corresponds to a palm touch based on at least one of the size of the touched area 1110, the major axis 1113, or the minor axis 1115. For example, the processor or the touch circuitry/ control circuit may compare the size of the touched area 1110 with a preset threshold, and when the size of the touched area 1110 is greater than or equal to the threshold, the processor or the touch circuitry/control circuit may determine that a palm touch has occurred.

According to an embodiment, there is provided a storage medium storing commands configured to be executed by at least one processor to enable the at least one processor to perform at least one operation that may include providing a first driving signal to a touch sensor in a first operation mode, detecting a first event related to mode switching, and providing a second driving signal different from the first driving signal to the touch sensor in a second operation mode based on detecting the first event.

As is apparent from the foregoing description, according to various embodiments, touch sensing signals may be controlled with the user's eye coming in contact or close to the electronic device, allowing the user to be less influenced by noise.

While the disclosure has been shown and described with reference to certain embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a housing including a first plate and a second plate positioned opposite the first plate;
   a display positioned between the first plate and the second plate;
   a touch sensing panel positioned between the display and the first plate, spaced apart from the display by an air gap, and including a plurality of first conductive lines extending in a first direction and a plurality of second conductive lines extending in a different direction from the first direction as viewed from the first plate and crossing the plurality of first conductive lines;
   a wireless communication circuit;
   a processor functionally connected with the display, the touch sensing panel, and the wireless communication circuit; and
   a memory functionally connected with the processor, wherein the memory stores instructions that, when executed by the processor, cause the processor to:
   detect an external object above or near the first plate;
   in a first operation mode, alternately and repetitively use a self capacitive sensing scheme and a mutual capacitive sensing scheme during each time period of consecutive time periods by periodically and sequentially applying the self capacitive sensing scheme and the mutual capacitive sensing scheme to the plurality of first and second conductive lines during the consecutive time periods, the self capacitive sensing scheme independently detecting variations in capacitances of the plurality of first conductive lines and the plurality of second conductive lines during a first time period, and the mutual capacitive sensing scheme providing voltages to the plurality of first conductive lines and measuring voltages at the plurality of second conductive lines during a second time period;
   detect a first event related to switching from the self capacitive sensing scheme to a modified self capacitive sensing scheme, wherein the self capacitive sensing scheme and the modified self capacitive sensing scheme differ from each other in a frequency or voltages of signals provided to the plurality of first conductive lines or the plurality of second conductive lines;
   in response to the detecting of the first event, switch alternating the self capacitive sensing scheme and the mutual capacitive sensing scheme in the first operation mode to alternating the modified self capacitive sensing scheme and the mutual capacitive sensing scheme in a second operation mode; and
   in the second operation mode, alternately and repetitively use the modified self capacitive sensing scheme and the mutual capacitive sensing scheme during each time period of the consecutive time periods by periodically and sequentially applying the modified self capacitive sensing scheme and the mutual capacitive sensing scheme to the plurality of first and second conductive lines during the consecutive time periods,
   wherein the first event related to the switching from the self capacitive sensing scheme to the modified self capacitive sensing scheme include at least one of: detecting a palm touch, executing a present application, a call reception, and a call connection.

2. The electronic device of claim 1, wherein the instructions, when executed by the processor, further cause the processor to determine a state of the electronic device and switch between the first operation mode and the second operation mode based on at least part of the state.

3. The electronic device of claim 2, further comprising:
   a speaker exposed through the first plate; and
   a proximity sensor positioned near the speaker,
   wherein the instructions, when executed by the processor, further cause the processor to determine the state of the electronic device using the proximity sensor.

4. The electronic device of claim 2, wherein the instructions, when executed by the processor, further cause the processor to determine the state of the electronic device using a proximity sensor upon receiving a call through the wireless communication circuit.

5. A method for operating an electronic device, the method comprising:
   in a first operation mode, alternately and repetitively using a self capacitive sensing scheme and a mutual capacitive sensing scheme during each time period of consecutive time periods by periodically and sequentially applying the self capacitive sensing scheme and the mutual capacitive sensing schemes to the plurality of first and second conductive lines during the consecutive time periods, wherein the self capacitive sensing scheme independently detects variations in capacitances of a plurality of first conductive lines and a plurality of second conductive lines during a first time period, and wherein the mutual capacitive sensing scheme provides voltages to the plurality of first conductive lines and measures voltages at the plurality of second conductive lines during a second time period;

detecting a first event related to switching from the self capacitive sensing scheme to a modified self capacitive sensing scheme, wherein the self capacitive sensing scheme and the modified self capacitive sensing scheme differ from each other in a frequency or voltages of signals provided to the plurality of first conductive lines or the plurality of second conductive lines;

in response to the detecting of the first event, switching alternating the self capacitive sensing scheme and the mutual capacitive sensing scheme in the first operation mode to alternating the modified self capacitive sensing scheme and the mutual capacitive sensing scheme in a second operation mode; and in the second operation mode, alternately and repetitively using the modified self capacitive sensing scheme and the mutual capacitive sensing scheme during each time period of the consecutive time periods by periodically and sequentially applying the modified self capacitive sensing scheme and the mutual capacitive sensing scheme to the plurality of first and second conductive lines during the consecutive time periods, wherein the first event related to the switching from the self capacitive sensing scheme to the modified self capacitive sensing scheme includes at least one of: detecting a palm touch, executing a preset application, a call reception, and a call connection.

6. The method of claim 5, wherein a first driving signal provided in the first operation mode includes first pattern signals of a first capacitive sensing scheme and second pattern signals of a second capacitive sensing scheme.

7. The method of claim 6, wherein a second driving signal provided in the second operation mode includes either (i) both third pattern signals of the first capacitive sensing scheme and the second pattern signals of the second capacitive sensing scheme or (ii) only the second pattern signals of the second capacitive sensing scheme.

8. The method of claim 7, wherein the third pattern signals include either a voltage different from a voltage of the first pattern signals or a frequency different from a frequency of the first pattern signals.

9. The method of claim 7, wherein a number of the third pattern signals is smaller than a number of the first pattern signals during a same period.

10. The method of claim 5, further comprising:
detecting a second event related to a mode switching; and switching an operation mode of a touch circuitry from the second operation mode to the first operation mode based on detecting the second event.

11. The method of claim 10, wherein the second event related to the mode switching includes at least one of: releasing the palm touch, releasing detection of an approach by a proximity sensor, terminating the preset application, releasing the call reception, or releasing the call connection.

12. A non-transitory storage medium storing commands that, when executed by a processor, cause the processor to perform an operation comprising:
in a first operation mode, alternately and repetitively using a self capacitive sensing scheme and a mutual capacitive sensing scheme during each time period of consecutive time periods by periodically and sequentially applying the self capacitive sensing scheme and the mutual capacitive sensing scheme to the plurality of first and second conductive lines during each time period of consecutive time periods, wherein the self capacitive sensing scheme independently detects variations in capacitances of a plurality of first conductive lines and a plurality of second conductive lines during a first time period, and wherein the mutual capacitive sensing scheme provides voltages to the plurality of first conductive lines and measures voltages at the plurality of second conductive lines during a second time period;

detecting a first event related to switching from the self capacitive sensing scheme to a modified self capacitive sensing scheme, wherein the self capacitive sensing scheme and the modified self capacitive sensing scheme differ from each other in a frequency or voltages of signals provided to the plurality of first conductive lines or the plurality of second conductive lines;

in response to the detecting of the first event, switching alternating the self capacitive sensing scheme and the mutual capacitive sensing scheme in the first operation mode to alternating the modified self capacitive sensing scheme and the mutual capacitive sensing scheme in a second operation mode; and in the second operation mode, alternately and repetitively using the modified self capacitive sensing scheme and the mutual capacitive sensing scheme during each time period of the consecutive time periods by periodically and sequentially applying the modified self capacitive sensing scheme and the mutual capacitive sensing scheme to the plurality of first and second conductive lines during the consecutive time periods, wherein the first event related to the switching from the self capacitive sensing scheme to the modified self capacitive sensing scheme includes at least one of: detecting a palm touch, executing a preset application, a call reception, or a call connection.

13. The non-transitory storage medium of claim 12, wherein a first driving signal provided in the first operation mode includes first pattern signals of a first capacitive sensing scheme and second pattern signals of a second capacitive sensing scheme.

14. The non-transitory storage medium of claim 13, wherein a second driving signal provided in the second operation mode includes either (i) both third pattern signals of the first capacitive sensing scheme and the second pattern signals of the second capacitive sensing scheme or (ii) only the second pattern signals of the second capacitive sensing scheme.

15. The non-transitory storage medium of claim 14, wherein the third pattern signals include a voltage different from a voltage of the first pattern signals and a frequency different from a frequency of the first pattern signals.

* * * * *